United States Patent Office 3,506,725
Patented Apr. 14, 1970

3,506,725
SEPARATING 1,5-DINITRONAPHTHALENE FROM 1,8-DINITRONAPHTHALENE
Hans-Juergen Sturm, Ludwigshafen (Rhine), and Guenter Steinhoff, Mannheim, Germany, assignors to Badische Anilin- & Soda-Fabrik Aktiengesellschaft, Ludwigshafen (Rhine), Germany
No Drawing. Filed Mar. 4, 1968, Ser. No. 709,928
Claims priority, application Germany Mar. 11, 1967, 1,618,109
Int. Cl. C07c 79/14, 79/10; B01d 9/02
U.S. Cl. 260—645                                    8 Claims

ABSTRACT OF THE DISCLOSURE

Separation of 1,5-dinitronaphthalene and 1,8-dinitronaphthalene from solutions of both substances in nitric acid by cooling and separation of the deposited 1,5-dinitronaphthalene followed by addition of water and separation of deposited 1,8-dinitronaphthalene. The products of the separation are dye intermediates.

---

This invention relates to the separation of 1,5-dinitronaphthalene and 1,8-dinitronaphthalene from solutions of both substances in nitric acid.

Nitration of naphthalene to form 1,5-dinitronaphthalene and 1,8-dinitronaphthalene is in general carried out at 40° to 80° C. in a mixture of concentrated sulfuric acid and nitric acid (mixed acid); a mixture of 1,5-dinitro and 1,8-dinitro compounds and resinous residues is obtained as the end product (BIOS Report 1152, pages 43 to 45). It is known from the said BIOS Report that the said mixture, after it has been separated from the mother liquor, subjected to various washing operations and dried, can be dissolved in ethylene dichloride and from the hot solution by fractional cooling there may be deposited and separated first the 1,5-component at 50° C. and then, after concentration of the filtrate, the 1,8-component at room temperature. Differences in solubility of the two dinitronaphthalenes in organic solvents are also utilized in two other prior art methods for the separation of such mixtures, dimethylformamide (British patent specification No. 933,680) and acetone being used. The said methods have the disadvantage that it is first necessary to separate the whole mixture of the end products and only after this has been done can the separation of the two dinitro compounds be carried out; only organic solvents are used for the separation.

Methods are known from Chem. Abs., 43, 6190 (1949) and from Chem. Zentr., 1, 587 (1938), which utilize differences in solubility of the two dinitronaphthalenes in concentrated sulfuric acid for separation. In these methods it is necessary to process the reaction mixture from the naphthalene nitration before separating the end products from sulfuric acid. Separation of the two dinitro compounds from the mother liquor is incomplete.

The object of this invention is to provide a new, simple and economical process for the separation of 1,5-dinitronaphthalene and 1,8-dinitronaphthalene from solutions of the two substances in nitric acid by cooling and separating the deposited 1,5-dinitronaphthalene followed by the addition of water and separation of the deposited 1,8-dinitronaphthalene.

These and other objects of the invention are achieved in a process for the separation of 1,5-dinronaphthalene and 1,8-dinitronaphthalene from mixtures of the two in a ratio of 25 to 40% by weight of 1,5-dinitronaphthalene to 75 to 60% by weight of 1,8-dinitronaphthalene by means of a selective solvent, by first depositing 1,5-dinitronaphthalene by cooling from a solution in 75 to 100% by weight, preferably 80 to 90% by weight, nitric acid of 1,5-dinitronaphthalene and 1,8-dinitronaphthalene, or from a solution of 1,8-dinitronaphthalene in which 1,5-dinitronaphthalene is partly dissolved and partly suspended, separating the 1,5-dinitronaphthalene and then depositing 1,8-dinitronaphthalene from the remaining solution by dilution with water.

The process according to this invention is based on the surprising observation that when a hot solution of 1,5-dinitronaphthalene and 1,8-dinitronaphthalene in nitric acid is cooled, 1,5-dinitronaphthalene crystallizes out first whereas the more readily soluble 1,8-dinitronaphthalene is only deposited upon dilution of the nitric acid mother liquor with water. Contrasted with the above-mentioned methods, the separation in accordance with this invention can be carried out in the reaction medium of the naphthalene nitration. The use of organic solvents is unnecessary. In some cases purer dinitronaphthalenes and higher yields are obtained than in the prior art methods.

The mixtures to be separated may be mixtures of 1,5-dinitronaphthalene and 1,8-dinitronaphthalene in a ratio of 25 to 40% by weight of 1,5-dinitronaphthalene to 75 to 60% by weight of 1,8-dinitronaphthalene such as are obtained, depending on the reaction conditions, in the nitration of naphthalene by means of mixed acid or pure nitric acid. In the case of reaction mixtures obtained with mixed acid, it is advantageous first to deposit and separate the crude mixture of the 1,5- and 1,8-compounds (cf. for example the above-mentioned BIOS Report), dissolve it in pure nitric acid and only then carry out the separation. Separation of the two dinitro compounds in the reaction mixture itself (i.e. a mixture of sulfuric and nitric acids) is less recommended because the end product may be contaminated and may be obtained in smaller yields than when the separation is carried out in pure nitric acid. For these reasons a more elegant method is to carry out the nitration and the separation in the same medium, i.e. nitric acid.

Separation of the two dinitronaphthalenes may be carried out from a solution of the two in 75 to 100% by weight, preferably 80 to 90% by weight, nitric acid. Depending on the composition of the mixture used and the concentration of the nitric acid, it is usual to use twice or ten times the weight of nitric acid with reference to the dinitronaphthalenes to be separated. The most favorable amount may easily be determined by a preliminary experiment. Nitric acid at the end of the nitration of naphthalene with nitric acid is present in the said concentration, i.e. the separation is advantageously carried out in the reaction mixture from the nitration; the mixture of the two components may also be dissolved in nitric acid of the said concentration and the separation then carried out. The said mixture of the two components may be introduced into nitric acid of the said concentration, with stirring and with or without heating, to dissolve the 1,8-compound completely while the 1,5-compound is dissolved to any extent or suspended, the separation then being carried out with the suspension thus obtained. Suspensions, for example the said reaction mixture from the nitration of naphthalene, may be subjected to the separation provided such suspensions contain the 1,8-component in a fully dissolved condition.

The cooling for the separation of the said mixtures from the said solutions or suspensions is as a rule down to 10° to 70° C., preferably 30° to 60° C. It is not so suitable to use temperatures below 10° C. for economical reasons, because a relatively large amount of nitric acid is required for separating the said mixtures. Temperatures above 70° C. are not so suitable because nitrous gases escape from the nitric acid to an increasing extent and this may have an unfavorable effect, for example by decreasing the concentration of the nitric acid. After the solution or suspension has been cooled, the 1,5-dinitronaphthalene is separated. Since deposition of the 1,8-component from the remaining solution by further cooling in general takes place only incompletely, it is advantageous to separate the 1,8-dinitronaphthalene by dilution with water. The optimum amount of water depends on the composition of the mixture used and on the concentration of the nitric acid and is in general from 5 to 100% by weight with reference to the nitric acid used.

Separation may be carried out as follows: A mixture of 1,5-dinitronaphthalene and 1,8-dinitronaphthalene is dissolved in the said ratio of the components in 75 to 100% by weight nitric acid at a temperature of more than 70° C., or a start is made direct from the reaction mixture from nitration in the manner described. The solution or suspension is cooled to a temperature of from 10° to 70° C. The deposited 1,5-dinitronaphthalene is filtered off and washed with nitric acid and then with water. The filtrate has water added to it, either in one batch or advantageously a little at a time. The 1,8-dinitronaphthalene deposited is filtered off and washed with nitric acid and water. The deposition of the respective components during the separation may be assisted by means for promoting the formation of nuclei, for example stirring, vibrating or the use of vessels having a rough surface.

The invention is illustrated by the following examples in which the parts specified are parts by weight.

EXAMPLE 1

60 parts of a mixture of 1,5-dinitronaphthalene and 1,8-dinitronaphthalene is dissolved in 350 parts of 80% by weight nitric acid by heating at 70° C. for a short time. The solution is allower to cool to 25° C. and the deposited 1,5-dinitronaphthalene is filtered off, washed with 80% by weight nitric acid and then with water until it is neutral, and then dried. 17 parts (29% of the theory with reference to the whole of the dinitronaphthalenes) of 1,5-dinitronaphthalene is obtained having a melting point of 210° to 212° C. 70 parts of water is added to the filtrate. 1,8-dinitronaphthalene is precipitated and this is suction filtered, washed with 65% by weight nitric acid and water and dried. 39 parts (65% of the theory with reference to the whole of the dinitronaphthalenes) of 1,8-dinitronaphthalene is obtained having a melting point of 160° to 164° C.

EXAMPLE 2

64 parts of naphthalene is introduced into 730 parts of 85% by weight nitric acid in the course of one hour at 30° to 35° C. while cooling. The mixture is then heated within thirty minutes to 40° C. and desposited portions of 1,5-dinitronaphthalene and 1,8-dinitronaphthalene are brought into solution by heating for a short time at 75° C. The solution is then allowed to cool to 30° C. and the deposited 1,5-dinitronaphthalene is filtered off, washed with 85% by weight nitric acid and then with water to the neutral point, and dried. 26 parts (24% of the theroy with reference to naphthalene) of 1,5-dinitronaphthalene is obtained having a melting point of 209° to 211° C. 150 parts of water is added to the filtrate. 1,8-dinitronaphthalene is precipitated and this is filtered off, washed with 65% by weight nitric acid and then water and dried. 56 parts (51% of the theory with reference to naphthalene) of 1,8-dinitronaphthalene is obtained which according to the infrared spectrum is practically free from 1,5-isomer.

EXAMPLE 3

155 parts of naphthalene is introduced during ninety minutes at 20° to 30° C. into 875 parts of 90% by weight nitric acid while cooling. The mixture is heated during thirty minutes to 60° C. and kept at this temperature for fifteen minutes so that the 1,8-dinitronaphthalene passes into solution while the 1,5-dinitronaphthalene remains substantially undissolved. The suspension is cooled to 55° C. during thirty minutes, the 1,5-dinitronaphthalene is suction filtered through a suction filter heated to 55° C., washed with 90 parts of 90% by weight nitric acid (the washing solution being added to the filtrate) and then with water to the neutral point and dried. 66.5 parts (25% of the theory with reference to naphthalene) of 1,5-dinitronaphthalene is obtained having a melting point of 212° to 214° C. 270 parts of water is added to the filtrate. 1,8-dinitronaphthalene is deposited and this is filtered off, washed with 65% by weight nitric acid and then with water and dried. 156 parts (59% of the theory with reference to naphthalene) of 1,8-dinitronaphthalene is obtained which is practically free from 1,5-isomer according to the infrared spectrum.

We claim:
1. A process for the separation of 1,5-dinitronaphthalene and 1,8-dinitronaphthalene from their mixture in a ratio of 25 to 40% by weight of 1,5-dinitronaphthalene and 75 to 60% by weight of 1,8-dinitronaphthalene, which process comprises:
   dissolving all of said 1,8-dinitronaphthalene and at least part of said 1,5-dinitronaphthalene in a solvent consisting essentially of nitric acid having a concentration of 75 to 100% by weight by heating to a temperature sufficient to effect said dissolution;
   cooling the solution to deposit said 1,5-dinitronaphthalene therefrom and separating said deposited 1,5-dinitronaphthalene from said solution; and
   subsequently diluting the solution with sufficient water to deposit said 1,8-dinitronaphthalene therefrom and separating said deposited 1,8-dinitronaphthalene from the resulting diluted nitric acid.

2. A process as claimed in claim 1 carried out with a solution of 1,8-dinitronaphthalene in which 1,5-dinitronaphthalene is partly dissolved and partly suspended.

3. A process as claimed in claim 1 wherein the starting solution is in an 80 to 90% by weight nitric acid.

4. A process as claimed in claim 1 wherein the separation is carried out in a solvent consisting solely of nitric acid which has been used as the reaction medium for the nitration of naphthalene into said mixture of 1,5-dinitronaphthalene and 1,8-dinitronaphthalene.

5. A process as claimed in claim 1 wherein 1,5-dinitronaphthalene is deposited by cooling to a temperature of between about 10° and 70° C.

6. A process as claimed in claim 1 wherein 1,5-dinitronaphthalene is deposited by cooling to a temperature of between about 30° and 60° C.

7. A process as claimed in claim 1 wherein said dissolution is accomplished by heating to a temperature of approximately 60° C. to 75° C. after which the solution is cooled to a temperature between about 25° C. and 55° C. to deposit said 1,5-dinitronaphthalene.

8. A process as claimed in claim 7 wherein the nitric acid as the solvent is used in an amount of about twice to ten times by weight with reference to the amount of dinitronaphthalenes being separated.

References Cited

Donaldson, The Chemistry and Technology of Naphthalene Compounds, Edward Arnold (Publishers) Ltd., London, 1958, pp. 151 and 163 to 166.

LELAND A. SEBASTIAN, Primary Examiner

U.S. Cl. X.R.

260—707